(No Model.)

W. D. BARTLETT.
VEHICLE SPRING.

No. 280,117. Patented June 26, 1883.

WITNESSES:
Chas. Niola.
C. Sedgwick.

INVENTOR:
W. D. Bartlett
BY Munn & Co
ATTORNEYS.

UNITED STATES PATENT OFFICE.

WILLIAM D. BARTLETT, OF AMESBURY, MASSACHUSETTS.

VEHICLE-SPRING.

SPECIFICATION forming part of Letters Patent No. 280,117, dated June 26, 1883.

Application filed January 19, 1883. (No model.)

*To all whom it may concern:*

Be it known that I, WILLIAM DEARBORN BARTLETT, of Amesbury, in the county of Essex and State of Massachusetts, have invented a new and Improved Mode of Hanging Carriage-Bodies, of which the following is a full, clear, and exact description.

Reference is to be had to the accompanying drawings, forming part of this specification, in which similar letters of reference indicate corresponding parts in both the figures.

Figure 1:
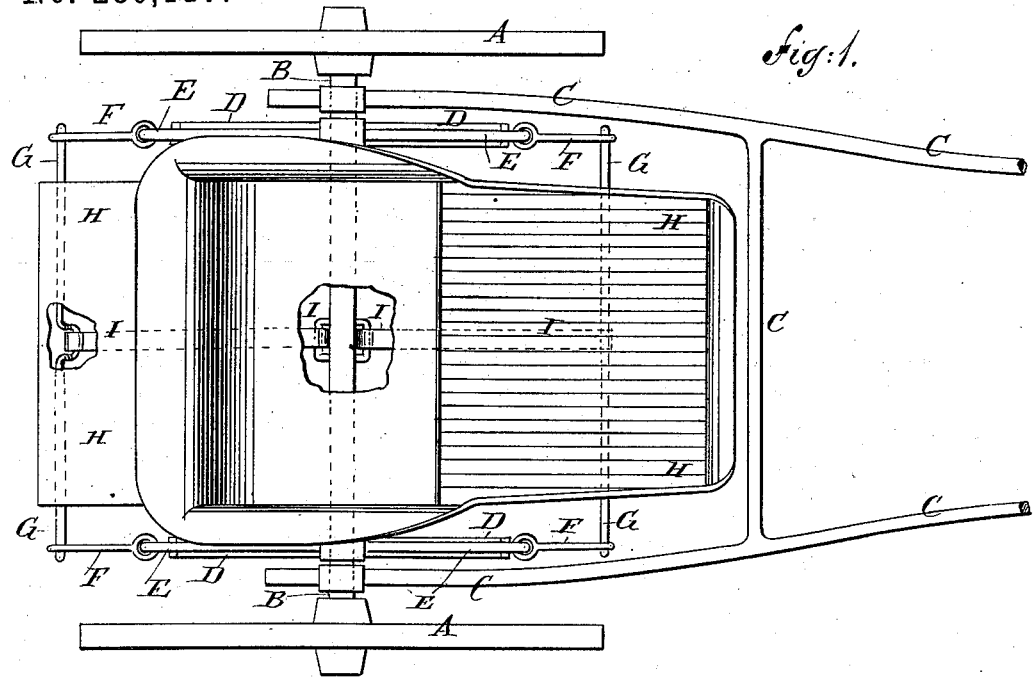
Figure 2:
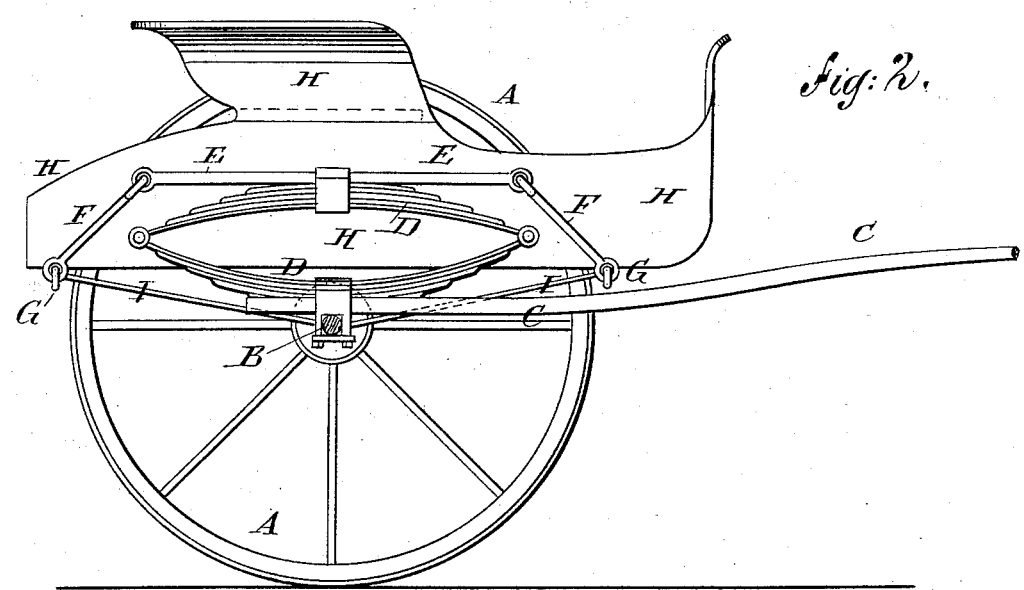

Figure 1 is a plan view of my improvement, parts being broken away. Fig. 2 is a side view of the same, a wheel being removed and the axle shown in section.

The object of this invention is to give greater freedom of movement to the bodies of carriages, and thus promote the comfort of those riding in said carriages.

The invention consists in the mode of hanging carriage-bodies by connecting cross-rods attached to the carriage-body, with side bars attached to the suspending-springs by links, whereby great freedom of movement will be given to the said carriage-body. The forward and rear parts of the carriage-body are connected with the axle by straps, to limit the movements of the said carriage-body upon the springs, side bars, links, and cross-rods, as will be hereinafter fully described.

I will show and describe my improvement as applied to two-wheeled carriages, but do not limit myself to that use, as it can be applied with equal advantage to four-wheeled carriages, street-cars, and other vehicles.

A A' are the wheels to the axle B, to which are attached the thills C. To the axle B are also attached elliptic or other suitable springs, D, to the upper parts of which are attached the middle parts of bars E.

To the ends of the bars E are hinged the upper ends of the links F, the lower ends of which are hinged to the projecting ends of cross-rods G.

To the middle parts of the rods G are attached the front and rear parts of the carriage-body H, which should be so arranged that the center of gravity of the said body, when loaded, will be about over the axle B. With this construction, when the carriage is moving up or down an incline, the weight of the load will tend to swing the body downward, which will give the lower links F a greater inclination and the upper links F a less inclination, so that the body H will be kept nearly level. The forward and rearward swing of the body H is limited by straps I, the inner ends of which are attached to the axle B, or to supports secured to the said axle. The outer ends of the straps I are attached to the middle parts of the cross-rods G, or to the forward and rear parts of the body H.

Having thus described my invention, what I claim as new, and desire to secure by Letters Patent, is—

1. The combination, with a carriage-body, H, and the suspending springs D, of the side bars, E, the link F, and the cross-rods G, substantially as herein shown and described, whereby great freedom of movement will be given to the carriage-body, as set forth.

2. The combination, with the carriage-body H, the axle B, the springs D, and the connecting side bars, links, and cross-rods E F G, of the straps I, substantially as herein shown and described, whereby the movements of the said body upon the said side bars, links, and cross-rods will be limited, as set forth.

WILLIAM DEARBORN BARTLETT.

Witnesses:
CHAS. SEDGWICK,
ALFRED LURCOTT.